Sept. 12, 1967 F. LANG 3,341,213

TOOL HOLDER

Filed Nov. 2, 1964 4 Sheets-Sheet 1

Sept. 12, 1967      F. LANG      3,341,213
TOOL HOLDER
Filed Nov. 2, 1964      4 Sheets-Sheet 3
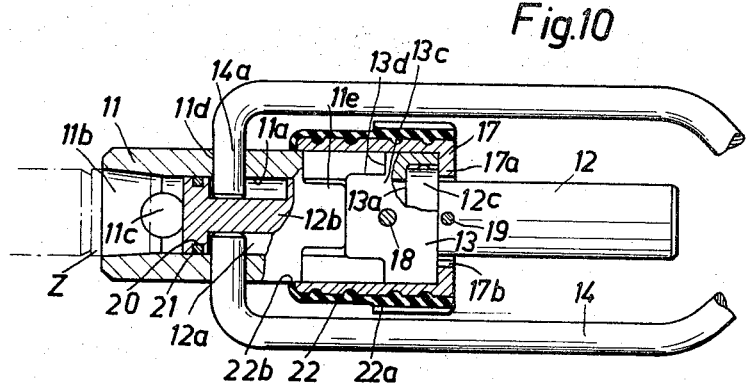
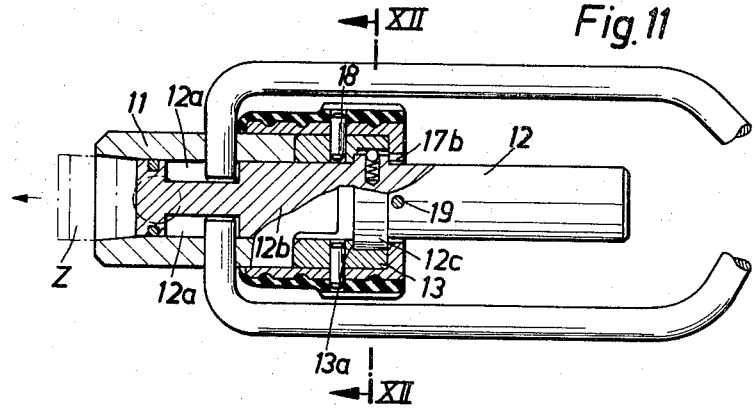
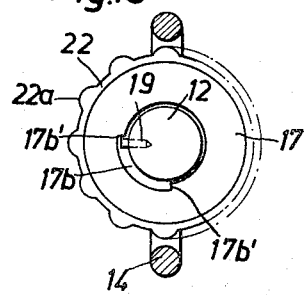
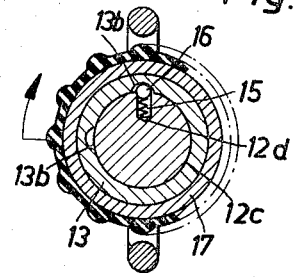

Fig. 14
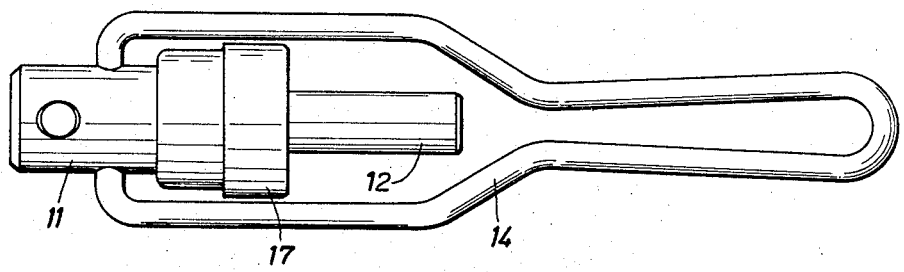
Fig. 15    Fig. 16    Fig. 17    Fig. 18
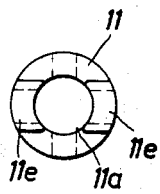 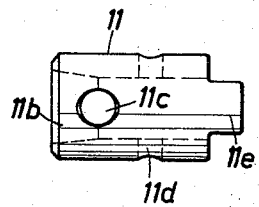 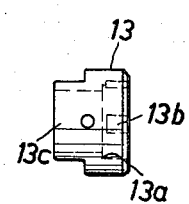 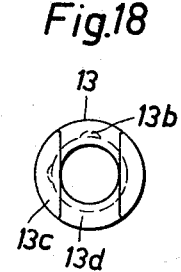

United States Patent Office 3,341,213
Patented Sept. 12, 1967

3,341,213
TOOL HOLDER
Fritz Lang, Ansbach, Bavaria, Germany, assignor to "Impex-Essen" Vertrieb Von Werkzeugen G.m.b.H., Ansbach, Bavaria, Germany, a German company
Filed Nov. 2, 1964, Ser. No. 417,258
Claims priority, application Germany, Nov. 2, 1963, J 24,670; Sept. 1, 1964, J 26,484
10 Claims. (Cl. 279—103)

Known tool holders have an inner cone for receiving a tool, in which the correspondingly conical tool shank is forcibly held. Ejection of such tools from the tool holder is usually effected by means of an ejector key or an ejector lever. Such loosening of the cone connection is possible as a rule with rotationally driven tools, for example with rotary spiral drills, but not with impact tools, for example impact drilling machines or power hammers, since the tool is driven more firmly into the conical support at each blow.

The problem mentioned occurs particularly with so-called self-boring split plugs or bolts which, as is known, are forced into the receptor material, for example masonry or rock, by the hammering action of an electric or compressed air hammer or by manual hammer blows, with simultaneous rocking of a hand-lever engaging the bolt holder. The rock chips produced on drilling the bolt hole in the masonry are removed through the inner boring provided in the bolt sleeve. On attaining the desired depth into the masonry, the bolt is withdrawn and cleaned inside from rock chips. Then a conical wedge or key member is inserted into the front end of the bolt sleeve and then the latter is again forced into the drilled hole, by means of an electric or compressed air hammer or a hand hammer, the bolt sleeve becoming spread open by the conical wedge member. When the bolt has been firmly anchored, its rearward end, which is constructed as a conical head and is located in the inner cone of the tool holder, must be broken off, which is usually effected by rearward tilting movement of the tool holder or of the electric or compressed air hammer. The connecting cone remaining in the internal cone of the tool holder, the so-called bolt end or butt, must then be removed by means of an ejector lever, which for this purpose is inserted and correspondingly rotated in the forward transverse drilling in the tool support which also serves for removal of the rock chips. As has been shown in practice, however, the removal of the bolt end in the way described, particularly with end cones of large dimensions, is not possible or is very difficult in many cases. This is due essentially to the bolt end being tilted or compressed on ejection and therefore before it is often strongly wedged into a point or line contact with the ejector lever, so that the latter cannot make contact with a suitable surface and rotate it. The bolt end must then be removed with a hammer and jumper from the tool-receiving portion of the tool holder.

The invention is based on the problem of providing a tool holder, especially for split bolts inserted by electric or compressed air hammers, which consists of a support member provided on one end with an internal cone for receiving the tool and a support shank connected therewith, which is not subjected to the above-mentioned disadvantages of known tool holders and moreover enables simple and easy loosening of the tool from the tool holder. This is achieved in accordance with the invention in that a distance piece or spacer element is provided between the support body and the support shank which holds the support body and the support shank selectively in an axially-extended operative position and allows them to move axially towards each other so far that the support shank ejects the tool from the tool holder body. In this way, a tool holder is provided in which, with the simplest of means, satisfactory removal of the tool holder or bolt end located inside the inner cone of the tool holder can be carried out very quickly and simply. This is due in particular to the fact that, on axial telescoping movement of the support body and the support shank the full force of the blow occurring is converted in the form of kinetic energy and applied to the tool or the bolt end. Jamming of the tool or bolt end in the internal cone of the tool holder is thus not possible. Removal of the tool or bolt end from the tool holder can be carried out in various ways, for example by briefly inserting the electric or compressed air hammer or, without actuating the electric hammer, merely by rearward movement of the support body relative to the support shank.

The new tool support or holder is particularly advantageous and reliable if an ejector sleeve is drawn over the distance piece, which rests at the one side on a collar on the support shank and at the other side surrounds the support body at the periphery where it is covered by the claw-like projections. The ejector sleeve is rigidly connected with the distance piece by screw threads, pins or other means.

Since longer use of the tool holder with corresponding use of the electric or compressed air hammer is always associated with a certain development of heat, it is recommendable to cover or spray the ejector sleeve with a heat-resistant material, particularly a suitable synthetic plastics material, and to provide this coating, for the purpose of better gripping, with rims or hand grooves. It is to be understood that the ejector sleeve can if required consist entirely of plastics material.

A further improvement according to the invention is obtained when the plastics material coating or plastics material sleeve is constructed on the side surrounding the support body so that a radial sealing lip is produced, which rests with a certain prestressed tension on the circumference of the support body and thus ensures good sealing against the ingress of dust. Also, for this purpose, against the end of the guide pin for the support shank or in the drilling of the support body, a corresponding radial or ring seal member can be inserted.

Further features according to the invention will appear from the accompanying drawings showing by way of example a first embodiment of the invention in FIGS. 1–9 and a second embodiment in FIGS. 10–18. In the accompanying drawings:

FIG. 10 shows the second or preferred embodiment of the tool holder with its extended hand-lever in the operative position, shown partly in longitudinal section;

FIG. 11 shows the tool support of FIG. 10 with the hand-lever in its position for removing the tool or bolt end, likewise in longitudinal section;

FIG. 12 shows a section on the line XII—XII of FIG. 11;

FIG. 13 shows a plan view of the back of the support with the handle in section;

FIG. 14 shows a plan view of the support with the hand lever;

FIG. 15 shows the support body in plan view with its rearward end provided with claw members;

FIG. 16 shows the support body in side view;

FIG. 17 shows the distance piece in side view;

FIG. 18 shows the distance piece in plan view on its forward end provided with claw members.

Figure 1:
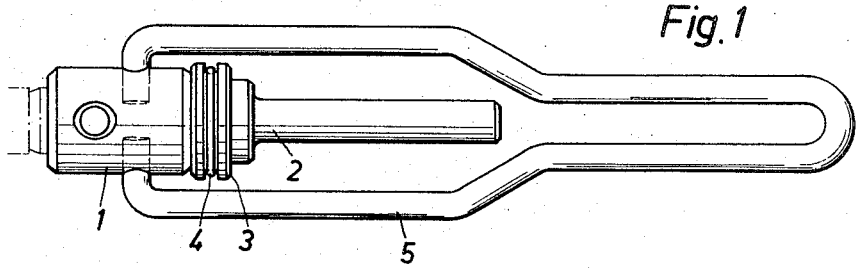
FIG. 1 shows the new tool holder, in plan view, with the hand-lever extended.
Figure 2:
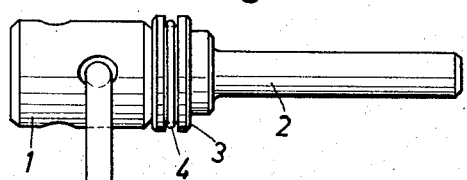
FIG. 2 shows a front view of FIG. 1 with the hand-lever pivoted through 90°.

In the present embodiments, the new tool holder or support serves to receive a self-boring split rag bolt or other expanding fixing member, the rearward removable cone end of which is shown in chain-dotted lines in FIGS. 1, 10 and 11.

In the embodiment illustrated in FIGS. 1–9, the tool holder consists essentially of a support body 1, a support shank 2 and a U-shaped distance piece or spacer element 3 lying between them with a spring member 4 and a bail-like hand-lever 5.

Figure 3:
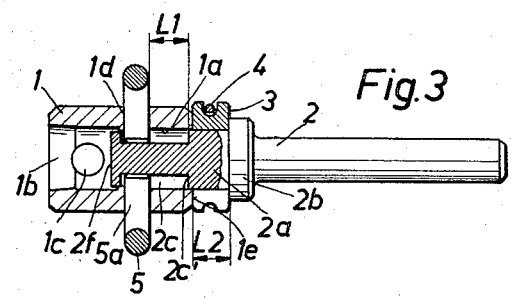
FIG. 3 shows the tool holder in partial longitudinal section.

As shown in FIG. 3, the support body 1 has a longitudinal drilling 1a which passes at the front end of the support body 1 into the conical inner cone 1b which serves for receiving the tool or rear bolt end Z of the expandible bolt D to be driven into the receptor wall. Removal of the rock chips produced in the drilling operation takes place through a transverse drilling 1c provided in the front part of the support body 1, whereas transverse drillings 1d also located in the support body serve to receive the inwardly bent ends 5a of the pivotally mounted hand-lever 5. The inner ends 5a of the pivot lever 5 project into diametrically opposite longitudinal slots 2c in the guide pin 2a of the support shank. The support body 1 and the support shank 2 are connected together by the bent lever ends 5a of the hand-lever having regard to the axial extent of the longitudinal slots 2c. The distance L1 between the ends 5a of the hand-lever and the rear limiting edges 2c' of the longitudinal grooves 2c is greater than the width L2 of the distance piece 3 located between the collar 2b of the guide shank 2 and the rear end face 1e of the support body 1. The distance piece 3 is freely located on the guide pin 2a of the support shank 2. It has the purpose of holding the support body and the support shank 2 in the extended position during insertion of the bolt. After removal of the removable distance piece 3, preferably consisting of a hardenable metal, the support body 1 and the support shank 2 can be axially moved inwardly until the front end surface 2f of the guide pin 2a abuts the shank of the tool or the bolt end located in the conical recess 1b.

Figure 4:
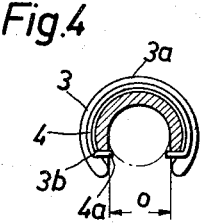
FIG. 4 shows the releasable distance piece in cross-section which is provided between the support body and the support shank of the tool holder.

In order to be able readily to loosen or remove the distance piece from the guide pin 3a, it is constructed as a clamp body. It has a wide receptor slot o corresponding to the diameter of the guide pin 2a, as well as a spring member 4 located in its outer annular groove 3a. As shown in FIG. 4, this spring member consists of a "C" spring which engages the guide pin 2a of the support shank 2 with its inwardly directed ends 4a. In order to hold the spacer element or distance piece 3 steadily, its outer circumference is roughened, preferably being knurled or bound, as with cord.

Figure 5:
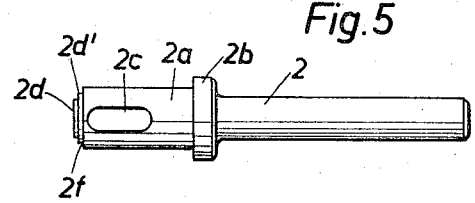
FIG. 5 shows a modified embodiment of the support shank.

In the guide shank 2 shown in FIG. 5, at the forward end 2f, several step-like staggered cylindrical projections 2d, 2d' are provided. The diameter of the guide pin 2a corresponds to the outer diameter of the largest bolt which is in use, whereas the diameters of the separate cylindrical projections correspond to the outer or inner diameters of the smaller bolts. The diameter of the first concentric projection 2d fits the inner boring of the receptor cone of the largest bolt and thus corresponds to the rear outer diameter of the cone of the next smaller bolt. It is thus possible for various sizes of bolts to use the same support shank 2. The shorter length of cone corresponding to the smaller bolts is compensated by a corresponding height dimension of the concentric projections 2d, 2d'.

Figure 6:
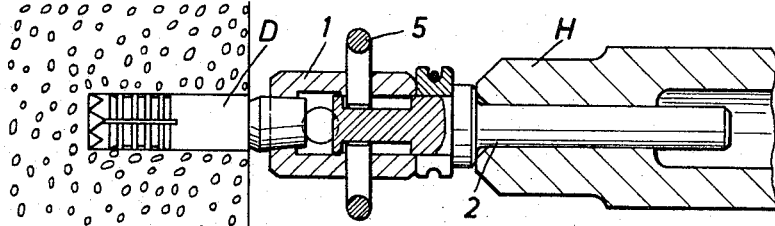
FIGS. 6–9 show the tool holder in various operative positions, as well as in the position for removal of the tool or bolt end.
Figure 7:
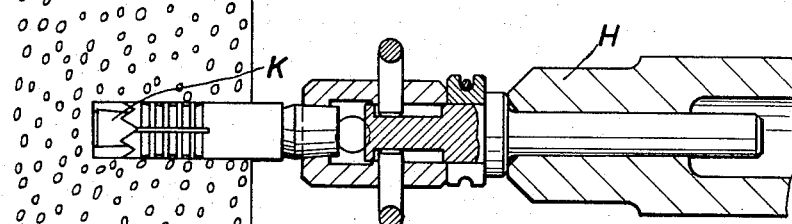
Figure 8:
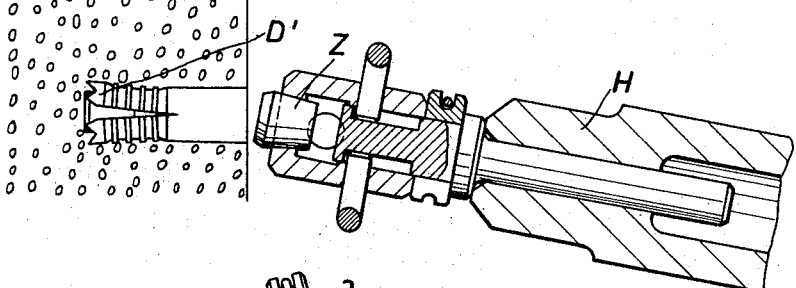

In the inserting process illustrated in FIGS. 6 and 7, the support shank 2 is inserted into the hammer H illustrated diagrammatically, for example an electric or compressed air hammer. The distance piece 3 lies between the rear end 1e of the support body and the collar 2b of the support shank 2. The support body 1 and the support shank 2 are thus located in their spaced operative position. Insertion of the bolt D fitted into the inner cone 1b of the support body 1 is effected by the impact action of the hammer H and simultaneous rocking of the support body and support shank 2 by means of the hand-lever 5. After drilling the entry hole in the receptor wall M, the conical spreader plug K associated with the bolt D is forced into the split part of the bolt and inserted together with the bolt D into the hole drilled in the masonry or rock, as shown in FIG. 7. The bolt is then driven in by the hammer blows, whereupon the forward limbs D' of the bolt become spread open by the plug K at the base of the hole, as shown in FIG. 8. The operation of breaking off the rear end part Z of the bolt is also illustrated, that is, the conical bolt end Z is broken off from the inserted bolt D by lateral tilting movement of the hammer.

Figure 9:
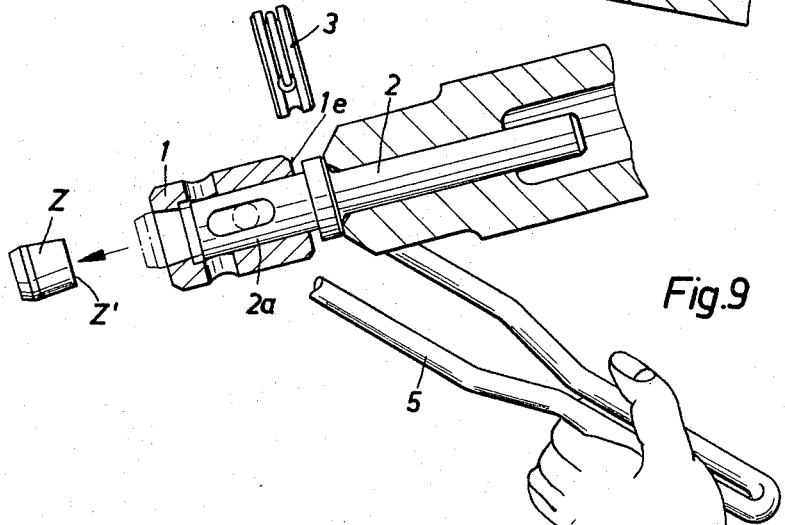

In order to be able to remove the broken bolt end Z from the inner cone 1b of the tool holder, the distance piece 3 is removed from the guide pin 2a of the support shank 2 (FIG. 9). The support body 1 and the support shank can then be telescopically moved together. Since the distance L1 between the ends 5a of the hand-lever and the limiting edge 2c' of the longitudinal grooves 2c is greater than the width L2 of the distance piece 3, on axial movement of the support body 1 and the support shank 2, its forward edge contacts the end 2f of the bolt zone Z and knocks the latter out of the apparatus. Axial movement of the support body 1 and the support shank 2 can be effected either by briefly inserting the electric or compressed air hammer or by causing a rapid rearward movement of the support body by means of the hand-lever 5. Even in the latter case, the bolt end Z is readily removed from the tool support. It has also been found that, on knocking the bolt end Z out of the tool holder constructed in accordance with the invention, no excessive force is required, since an impact uniformly distributed over the flat face Z' of the bolt end is produced, whereby it is easily knocked straight out without tilting or jamming.

In the case of the improved embodiment shown in FIGS. 10–18, the new tool holder consists essentially of four main parts, namely the tool holder body 11, a support shank 12, a distance piece or spacer element 13 and a bail-like hand-lever 14. The support body 11, as shown particularly in FIGS. 15 and 16, has a longitudinal drilling 11a, which at the front end of the guide body 11 passes into the inner cone 11b which serves for receiving the self-drilling tool or expansion bolt provided with a conical part Z. Through the transverse drilling 11c provided in the front part of the support body 11, removal takes place of the rock chips produced during drilling, whereas the transverse drillings 11d likewise provided in the support body 11 serve for reception of the inwardly directed ends 14a of the pivotally-mounted hand-lever 14. The inner ends 14a of the hand-lever 14 project into diametrically-opposite longitudinal grooves 12a in the guide pin 12b of the support shank (see FIGS. 10 and 11). The support body 11 and the support shank 12 are held together by means of the angled ends 14a of the hand-lever 14 over the length of the axial dimension of the longitudinal grooves 12a. In a peripheral groove 20 on the guide pin 12b of the support shank, a sealing ring 21 is located which serves for dust sealing.

On the guide pin 12b of the support shank 12, a distance piece 13 is mounted, rotatably in this case. It lies with its inner rearwardly-directed shoulder 13a on the collar 12c of the support shank 12 and overlaps the whole collar 12c in its periphery. In the part of the distance piece 13 surrounding the collar 12c (as shown in FIG. 12), two notches 13b mutually displaced by 90° are provided, in which a ball catch 16 can engage which is guided in a drilling 12d in the collar 12c under the action of a spring 15, in order in this way to hold the distance piece 13 in one or other of its desired positions of rotation. On the side facing the distance piece 13, the support body is provided with two lug-like projections 11e which, in the operative position illustrated in FIG. 10, contact opposed lugs 13c provided on the forward end surface of the distance piece 13 and, in the ejection position according to FIG. 11, engage in recesses 13d formed in the distance piece 13 between the lugs 13c.

Over the distance piece 13, an ejector sleeve 17 (FIGS. 10, 11 and 12) is disposed, which is fixed on the distance piece 13 by means of locating pins 18. The ejector sleeve 17 abuts the distance piece 13 at its inner collar member 17a. As shown particularly in FIG. 13, the inner collar 17a of the ejector sleeve 17 is provided with a segmental groove 17b, in which a pin 19 anchored to the support shank 12 engages. The pin 19, by contact with the ends of the groove 17b', causes limited rotation of the ejector sleeve 17 and the distance piece 13 coupled to it, so that in the end positions of the distance piece 13 the ball catch 16 can readily click into its notches 13b, as can be seen in FIGS. 12 and 13.

In the embodiment of the support body 11 according to FIGS. 15 and 16, the lug-like projections 11e are made tapered by being machined from segmental pieces. Conversely, the segmental lugs 13c are formed on the distance piece 13 as shown in FIGS. 17 and 18 by milling out a correspondingly deep groove 13d.

The ejector sleeve 17 is provided with a cover 22 of rubber or plastics material. Also, it can be entirely constructed of such a material. The cover 22 for the purpose of improved grip is provided with ribs or raised portions 22a (FIGS. 12 and 13). It is so constructed on the end facing the support body 11 that it forms a radial sealing lip 22b, which lightly presses abuot the periphery of the support body 11.

I claim:

1. Tool holder for pneumatic hammers or the like adapted to drive expansion bolts, comprising a support body formed with a conical bore for receiving a tool and a support shank axially aligned with and connected to said support body, a spacer element movably located between and coaxial with said support body and said support shank, said support body and said support shank being movable in their axial direction relative to one another, when said spacer element is moved from operative spacing position, so as to bring said support shank into engagement with the tool received in said conical bore of said support body, whereby the tool is ejected from said support body.

2. Tool holder according to claim 1, wherein said support body is formed with an axial bore and said support shank includes a guide pin portion slidably received in the axial bore of said support body and a collar portion adjacent said guide pin portion, said collar portion having a diameter greater than that of said guide pin portion, said spacer element comprising a clamping body mounted on said guide pin portion coaxially therewith, said spacer element abutting at one side an end face of said support body and at the other side said collar portion of said support.

3. Tool holder according to claim 2, wherein said spacer element is U-shaped and has an opening corresponding to the diameter of said guide pin portion and a C-shaped spring disposed in an annular groove formed in said spacer element, said spring having inwardly directed ends engageable with said guide pin portion for clamping said spacer element thereto.

4. Tool holder according to claim 2 including a bail-like hand lever having a pair of inwardly directed ends pivotally received respectively in a pair of diametrically opposed axially extending elongated grooves formed in said guide pin portion, the distance between the ends of said hand lever and the respective ends of said elongated grooves closest to said collar portion being greater than the width of said spacer element.

5. Tool holder according to claim 2 wherein said guide pin portion has a free end and a plurality of step-like cylindrical projections are located on said free end.

6. Tool holder according to claim 1 wherein said spacer element is adjustable on said support shank to at least two different axial positions in one of which, constituting the operating position of the tool holder, said support shank and said support body are axially spaced apart a predetermined distance, and in the other of which, constituting the tool ejection position of the tool holder, said support shank and said support body are axially spaced apart a distance smaller than said predetermined distance.

7. Tool holder according to claim 6 wherein said spacer element is formed with a pair of recesses axially spaced from one another, and said support shank carries a resiliently mounted ball adapted to be alternately received in said pair of recesses for holding said spacer element respectively in said operating position and said tool ejection position thereof.

8. Tool holder according to claim 6 wherein said spacer element comprises a ring rotatably mounted on said support shaft, said ring having an end face adjacent said support body and formed with a plurality of lug-like projections, said projections in said operating position of the tool holder, being in engagement respectively with lug-like projections formed on said support body and, in said tool ejection position of the tool holder, said projections of said ring being received in respective recesses located between said projections of said support body.

9. Tool holder according to claim 8 including an ejector sleeve secured to said spacer ring and surrounding said lug-like projections of said support body, said ejector sleeve being formed with a radially inwardly extending collar, said support shank being formed with a radially outwardly extending collar engageable by one end face of said ejector sleeve collar, and said spacer ring being formed with an annular shoulder engageable by the other end face of said ejector sleeve collar.

10. Tool holder according to claim 9 including a covering for heat-insulating material for at least one of said spacer ring and said ejector sleeve.

References Cited

UNITED STATES PATENTS

| 1,037,799 | 9/1912 | Schafer | 279—103 |
| 2,608,886 | 9/1952 | Morse | 279 |
| 3,070,382 | 12/1962 | Dieterich | 279—19 |

ROBERT C. RIORDON, *Primary Examiner.*

H. V. STAHLHUTH, *Assistant Examiner.*